United States Patent [19]
Rausch

[11] Patent Number: 4,473,605
[45] Date of Patent: Sep. 25, 1984

[54] DECORATION ELEMENT FOR COVERING AND EMBELLISHING FURNITURE

[76] Inventor: Karl Rausch, Im Rosengaertle 15, D-7500 Karlsruhe-Durlach, Fed. Rep. of Germany

[21] Appl. No.: 302,473

[22] PCT Filed: Jan. 12, 1981

[86] PCT No.: PCT/DE81/00010

§ 371 Date: Sep. 11, 1981

§ 102(e) Date: Sep. 11, 1981

[87] PCT Pub. No.: WO81/01978

PCT Pub. Date: Jul. 23, 1981

[30] Foreign Application Priority Data

Jan. 11, 1980 [DE] Fed. Rep. of Germany ....... 3000920
Jan. 14, 1980 [DE] Fed. Rep. of Germany ....... 3001097

[51] Int. Cl.³ ............................................. B32B 21/10
[52] U.S. Cl. ....................................... 428/17; 52/311; 52/730; 144/353; 428/294; 428/326
[58] Field of Search ......................... 52/311, 727, 730; 248/345.1; 428/14, 50, 187, 364, 373, 106, 294, 295, 17, 326, 541; 156/63; 144/353; D6/57; 15/DIG. 6, 159 A

[56] References Cited

U.S. PATENT DOCUMENTS

| | | | |
|---|---|---|---|
| 178,949 | 6/1876 | Penley | 428/294 X |
| 503,827 | 8/1893 | Bush | 428/187 X |
| 1,941,518 | 1/1934 | Twichell | 428/14 |
| 1,979,240 | 11/1934 | Adelmann | 15/DIG. 6 |
| 2,093,831 | 9/1937 | Fletcher | 428/50 |
| 3,570,435 | 3/1971 | Morrison | 428/16 X |
| 3,597,291 | 8/1971 | Swaringen | 428/35 X |
| 3,640,797 | 2/1972 | Taguchi et al. | 428/151 X |
| 3,655,469 | 4/1972 | Huron | 428/35 X |
| 4,037,369 | 7/1977 | Cambell | 15/159 A |
| 4,047,344 | 9/1977 | Postman et al. | 52/311 X |
| 4,061,514 | 12/1977 | Strugatz | 428/50 X |
| 4,061,809 | 12/1977 | Mautner | 428/50 |
| 4,083,740 | 4/1978 | Hamanaka | 428/11 X |

FOREIGN PATENT DOCUMENTS 1178587 5/1959 France .

*Primary Examiner*—Henry F. Epstein
*Attorney, Agent, or Firm*—Berman, Aisenberg & Platt

[57] ABSTRACT

The invention is a novel covering and optical embellishing of surfaces and edges of furniture structures, particularly legs and/or portions of frames and/or bodies of seats or resting furniture, tables, cupboards, shelves, mirrors and the like. The decoration element is comprised substantially of a plurality of long strands having a constant cross sectional area, made from the core of a tropical creeper or palmyra. The ligneous, fibrous strands are free of knots and very flexible, and are arranged with most of them adjacent, parallel, and touching each other without any space, thus forming a complete optical covering on the visible surfaces and edges of the structure. The element made, for example, from "Palmyra" creepers is, because of its inner structure of small channels and absence of knots, substantially perfectly homogeneous on its entire length with respect to its structure and physio-mechanical properties. It is extremely hard, very flexible, and may therefore be folded with a relatively small radius of curvature without any risk of breaking, as is the case with known materials. The strand presents hardly any risk of splitting or bursting when pierced transversely with respect to the channels by a pin or a nail which secures it to the underlying frame.

7 Claims, 24 Drawing Figures

Fig. 6
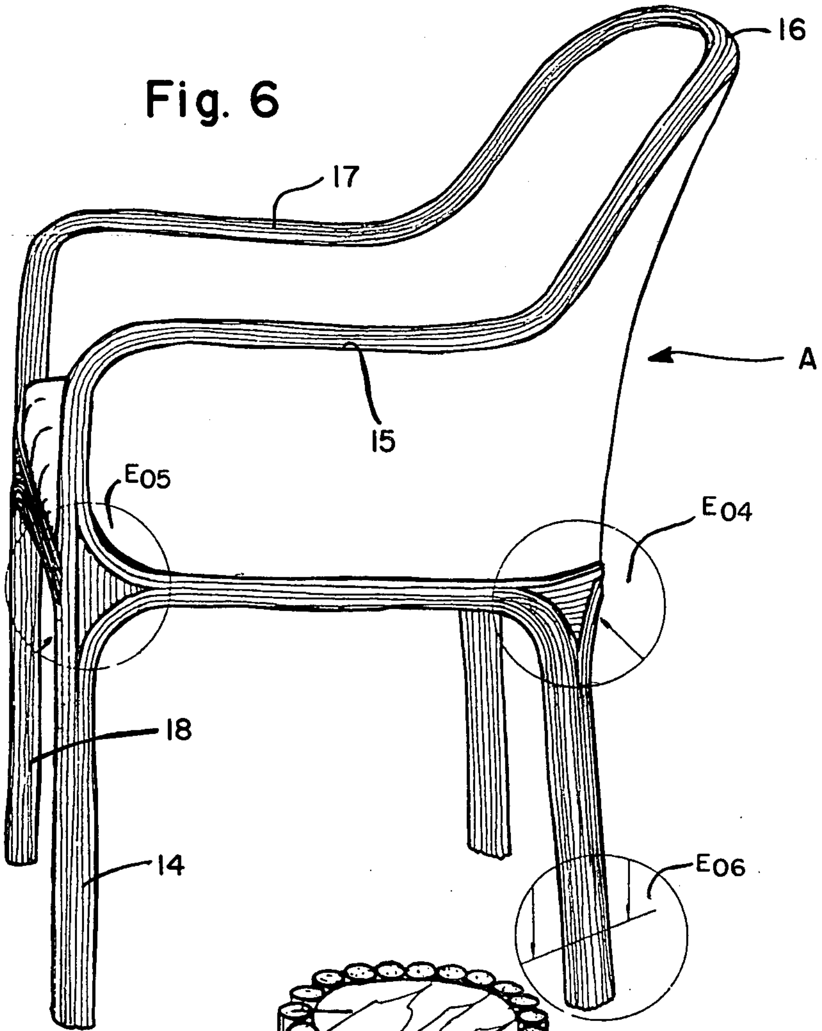
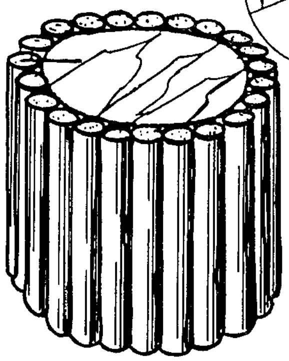
Fig. 7

Fig. 10
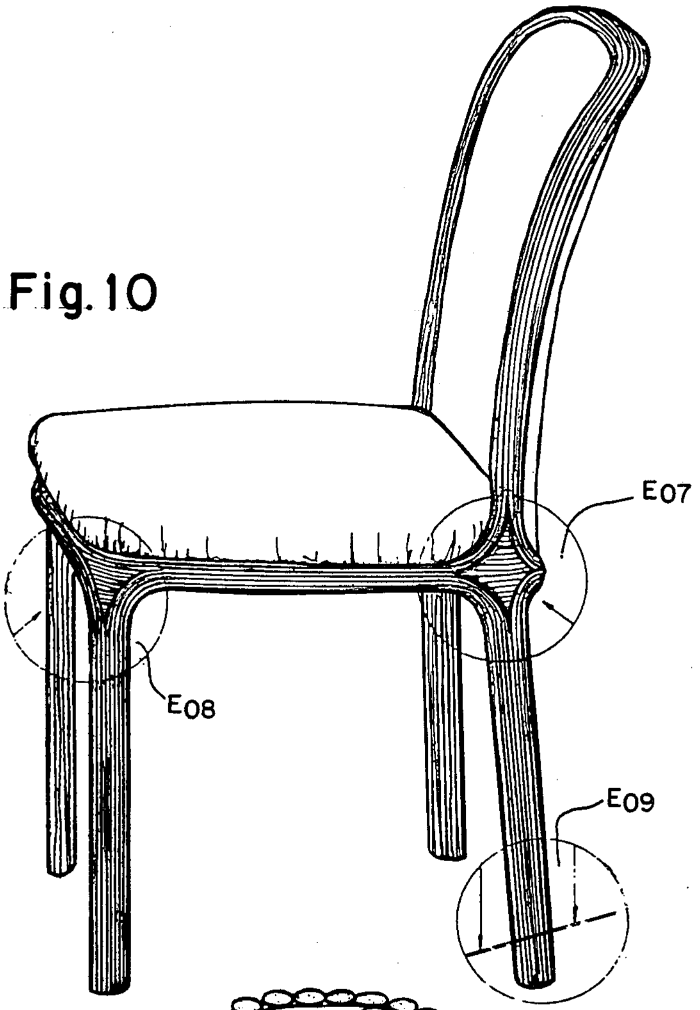
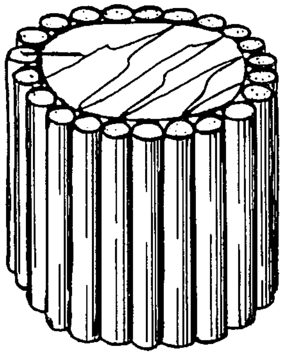
Fig. 11

Fig. 15
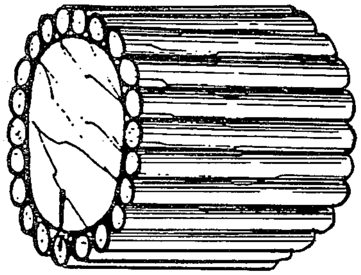
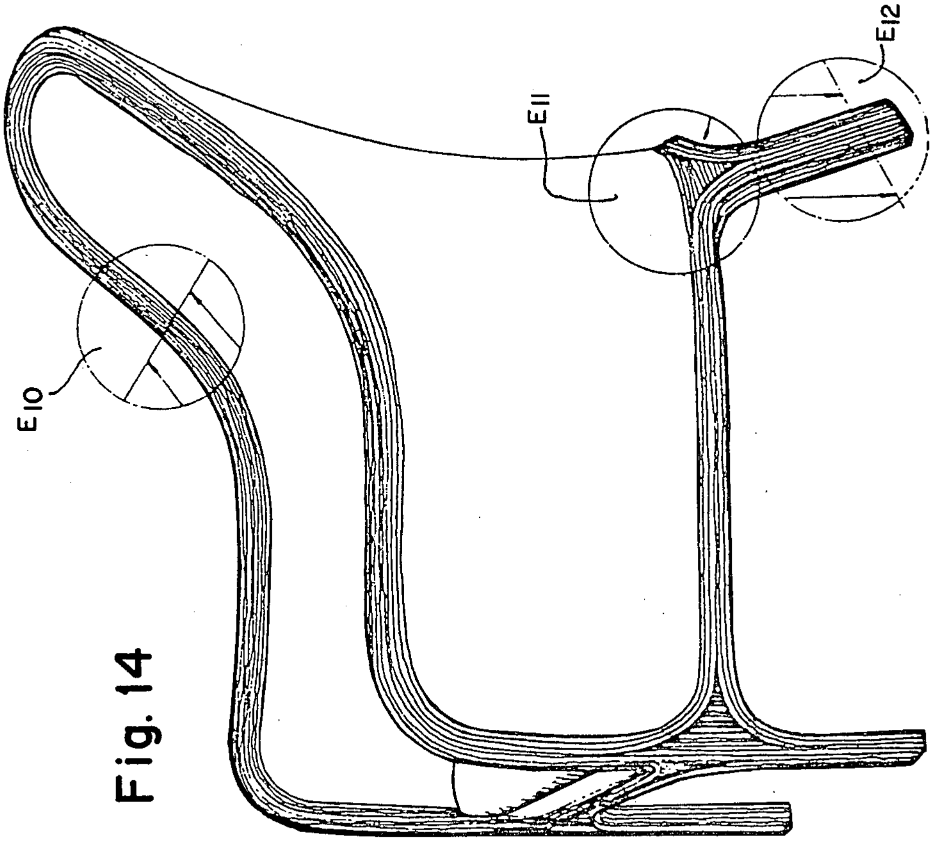
Fig. 14

DECORATION ELEMENT FOR COVERING AND EMBELLISHING FURNITURE

The invention relates to a decoration element for covering and embellishing visible surfaces and edges of furniture structures, particularly legs and/or portions of frames and/or of seats or resting furniture, tables, cupboards, sideboards, racks, shelves, mirrors and similar items.

Since the beginning of time and without regard for a particular culture or heritage, man has constructed furniture for use in his home, in order to store his goods, to ease household chores or to provide something to sit or to lie on. In addition to constructing furniture as sturdy as possible so that it would last long, man has also been desirous of having attractive pieces of furniture, regardless of his location on this globe. Furniture might be decoratively painted, covered with paint, provided with a veneer, covered, upholstered, inlaid with precious woods or stones or decorated in some other way with a suitable decoration.

Decorative elements of the type just described and referred to in the beginning are known all over the world. Depending upon the landscape and the natural construction materials available, split rattan, reed, dried corn or rice stalks, palm leaves, hemp, jute, rush, rattan palm, bamboo, wickerwork or something similar are used. Known to be comparatively brittle and inflexible are particularly those materials mentioned last. They can thus only be bent slightly, for example at the corners or round parts of furniture pieces they are intended to decorate, and can hardly be conformed to the contours of the pieces and securely fastened in a satisfactory manner. Accordingly, these materials must be mitre cut and joined for attachment to the base structure of the furniture pieces, attachment being by means of small nails or pins.

However, this type of attachment frequently causes the materials mentioned to split, resulting in a decoration that is not firmly connected to the furniture and which thus might inadvertantly drop off or at least can buckle up. This not only makes the furniture piece unsightly but might also injure persons or damage their clothing.

Accordingly, the intent and purpose of the invention is to provide a decoration element of the type mentioned in the beginning for embellishing furniture, such decoration being applied for the purpose of covering the base structure of the furniture pieces such and attached such that the above-mentioned deficiencies are obviated. In addition, the type of arrangement and fastening the new type of decoration should provide the embellished piece of furniture with an air of elegance by its pleasing understatement of beauty.

This problem is solved according to the invention by providing a plurality of more or less long strings or strands of a constant cross-section area over their entire length made from the core of a tropical creeper or palm. The ligneous, fibrous strings, free of knots and very flexible are arranged mostly adjacent and parallel and touching each other substantially without any space between them, thus forming an optically complete covering of the visible surfaces and edges of the structure, being attached to the latter by fixing means.

The starting material preferred in accordance with the invention is the core of the palmyra palm which grows in tropical forests, for example in Indonesia.

Considered particularly advantageous according to the invention is an arrangement of the strings or strands in approximately circular fashion, looking at a frame cross-section; complete circular arrangement of course being the best. The diameter of the strings could be between 4–8 mm, preferably however exactly 6 mm. A string of this dimension on the one hand enables solid attachment to the structure or frame of a piece of furniture with customary pins, nails or similar items without damaging or breaking the string itself as a result of incorrect workmanship, for example, eccentric positioning of the pins or nails. On the other hand, the diameter of the strings pursuant to the invention is just large enough to give the furniture piece after their attachment an appearance that is neither plump nor miniscule but very pleasing to the eye, as apparent from the illustrations of furniture pieces enclosed provided with the decoration element of the invention.

The construction material preferred in accordance with the invention, the core of the palmyra palm is excellently suited as decoration element for covering and embellising furniture frames or structures for the following reasons as described below:

As is known, tropical creepers grow in tropical forests to achieve lengths that have no practical limit. They may be 50, 100, 150 meters long, for example, without encountering any natural limitation on their growth, as is the case with woods familiar here used to construct furniture. Creepers may grow daily up to 0.4 meters as can be determined by the so-called growth knots, out of which either a new leaf, fruit or blossoms will emerge. However, these growth knots are recognizable in the core merely as a hardly noticeable irregularity in colour of an otherwise very homogenous colour of the core.

In contrast to those woods that grow in this part of the world or are otherwise familiar as woods employed in furniture construction, the growth knots of tropical creepers do not show changes familiar from timber knots that would alter the appearance of the core structure or even change the mechanical properties of the core at that location to advantage or disadvantage. Similarly, the core from palmyra palm is practically completely homogenous in every respect over its entire length, particularly as concerns its structure and the physiomechanical properties relevant here. It is extremely tough, very flexible and thus can be bent into circles of comparatively small radius without the risk of breaking, as would be the case for known materials.

The reason for these superior properties resides in the different inner structure of the core of tropical creepers or palms, for example that of rattan and primarily of palmyra, compared with that of the type of woods familiar here. The cross-section of their core is similar to that of animal bone: recognizable are the large number of small channels of approximately circular cross-section extending parallel to the core axis on its inside over the entire length of the creeper or palm. These channels provide the core not only with its great strength and flexibility but also its tendency to hardly split or splinter when pierced by a pin or a nail at right-angles to its direction of growth, i.e., lateral to the direction of the channel. Unfortunately, such breakage or splitting occurs far too quickly in the case of woods already familiar for decorative purposes.

Additional features, details and advantages are apparent from the description of the preferred embodiments of the invention, as well as from the illustrations of furniture pieces demonstrating the decoration element of the invention, shown in part as line drawings and in part as photographs.

BRIEF DESCRIPTION OF THE DRAWINGS

FIG. 6 shows an armchair with the decoration element of the invention, as seen from the side;

FIG. 7 shows a leg of the armchair of FIG. 6 (detail $E_{06}$) in cross-section;

FIG. 10 shows a dining room chair with the decoration element of the invention from the side;

FIG. 11 shows a leg of the dining room chair of FIG. 10 (detail $E_{09}$) in cross-section;

FIG. 14 shows an armchair with the decoration element of the invention from the side;

FIG. 15 shows a leg of the armchair of FIG. 14 (detail $E_{12}$) in cross-section;

DETAILED DESCRIPTION

Figure 1A:
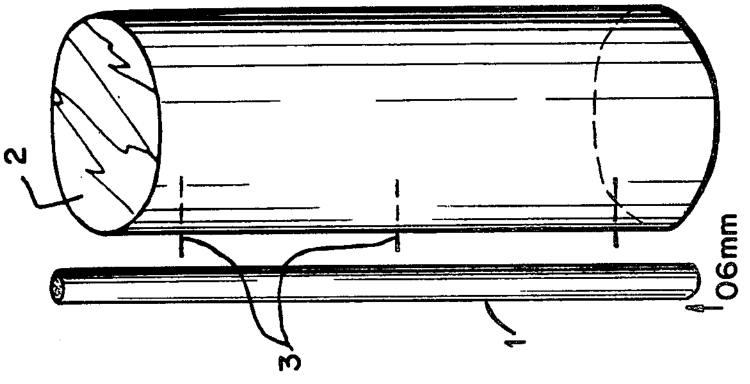
FIGS. 1*a*–1*d* show a means of anchoring the decoration element of the invention of the frame and/or supporting structure of a piece of furniture.
Figure 1B:
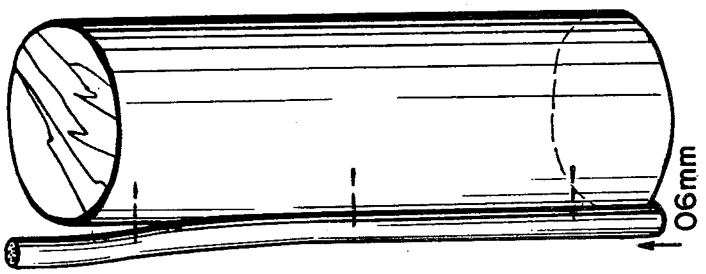
Figure 1C:
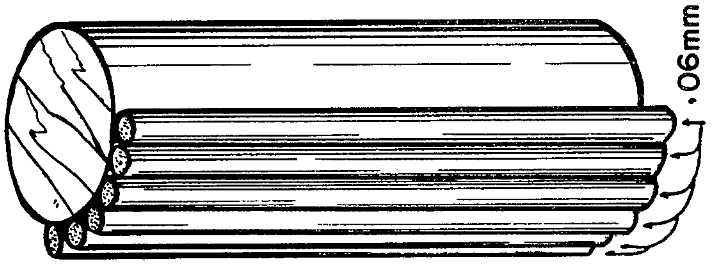
Figure 1D:
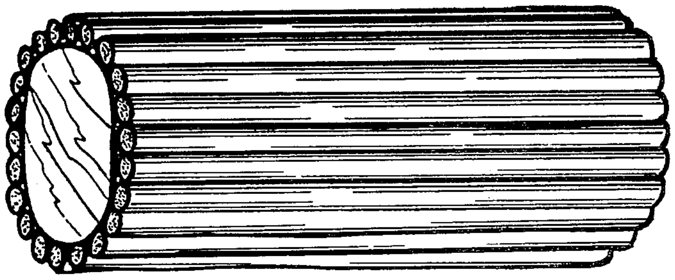

FIGS. 1*a*–1*d* basically illustrate how a string or strand 1 of preferably round cross-section, preferably of palmyra core having a diameter of preferably 6 mm, is attached to a furniture frame or structure 2 by employing fixing means 3. Suitable fixing means 3 might either be pins (without heads) or nails that partly penetrate the wood of the furniture frame or substructure, entering said wood through the side of the core strand 1 touching the wood, i.e., the not visible side of the core strand. This ensures on the one hand the advantage that the attachment is optically not visible. On the other hand, the pins cannot extend beyond the core, thus cannot injure persons or damage clothing, table cloths, etc. Obviously, strand 1 might also be attached to frame structure 2 using nails or pins starting from the visible outer side of the core strand, but this would have the disadvantages mentioned. Furthermore, it would then probably be necessary to close the holes resulting from the nails or pins for optical reasons, using suitable agents such as lacquer, wax etc.

To be considered when mounting the core strands 1 pursuant to the invention, is placing the first strand along a very specific line with mathematical precision, which might proceed straight or in a desired curved direction to frame structure 2, because displacement determines the direction of all other strands, as is readily apparent. An irregularity in the line or shape of the curvature desired will be propagated successively by all other strands resulting in an irregular appearance of the cover provided by the totality of the core strands.

Figure 2:
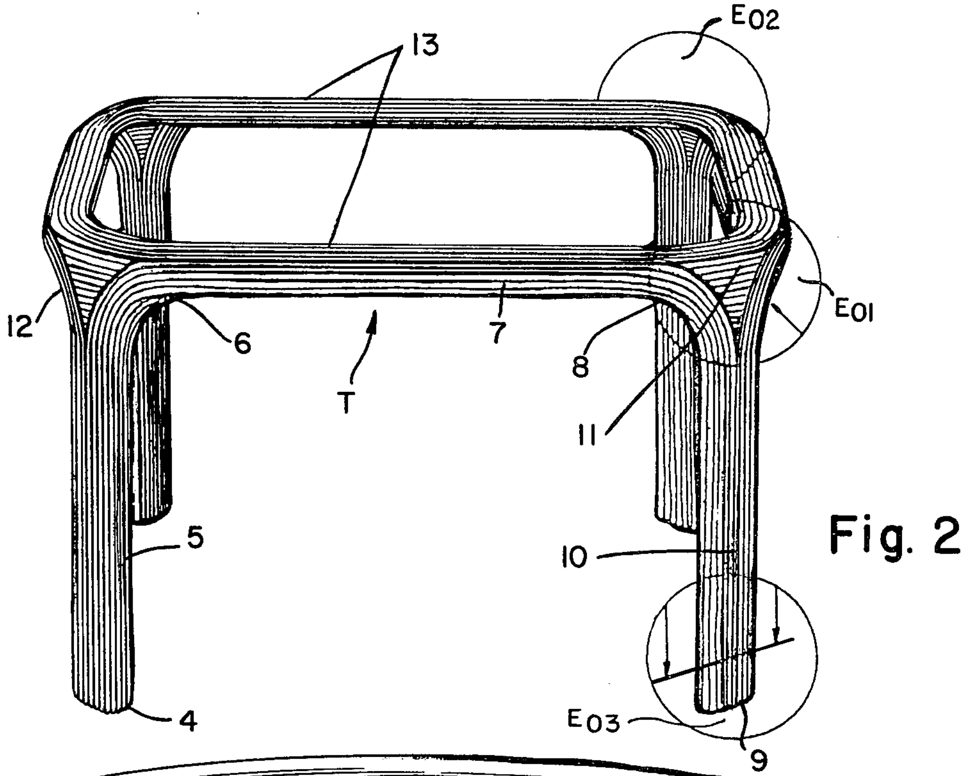
FIG. 2 shows a square side or end table with the decoration element of the invention, without the table plate.

FIG. 2 shows a table T with the decoration element of the invention made of palmyra core strands 1. One can see that the strands then, starting for example at the foot 4 of one leg 5 proceed without interruption pass the rounded off corner 6 of the table along the supporting structure 7 for the table plate (removed here) and pass the rounded off corner 8 of the table down to foot 9 of the neighbouring leg 10. Achieved in this manner is an optically pleasing line because the eye does not encounter any joints whatsoever.

An entire bundle of core strands 1 extends also along the edge of the table, their ends meeting in a single joint at different locations so that it is indeed difficult to find the individual ends. Merely the corner sections 11 and 12 yield empty three-cornered areas on the frame or structure 2 which can be closed using short core sections as illustrated for example in FIG. 5, after work on covering the legs of the square table frame 13 with core strands 1 has been completed.

The principle of covering the furniture frame of an armchair A with core strands 1 is similar to that thus provided for table T, as shown in FIG. 6. Of interest is here the large length which several strands 1 must have for this piece of furniture: some strands start at the left front leg 14 and proceed along the armrest 15, the backrest 16, the armrest 17 and down to the front right leg 18, where they then end.

In the case of a 3-seater sofa, strands might be as long as 5 meters, for example. If necessary, it is possible to use core strands that are still much longer.

Figure 17:
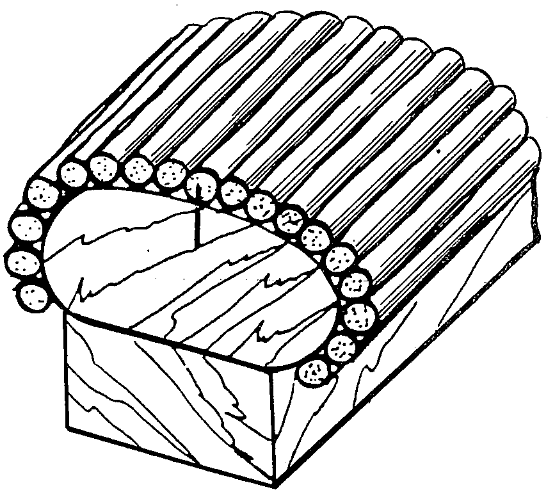
FIG. 17 shows detail $E_{10}$ of FIG. 14 at the right side of the back rest.
Figure 16:
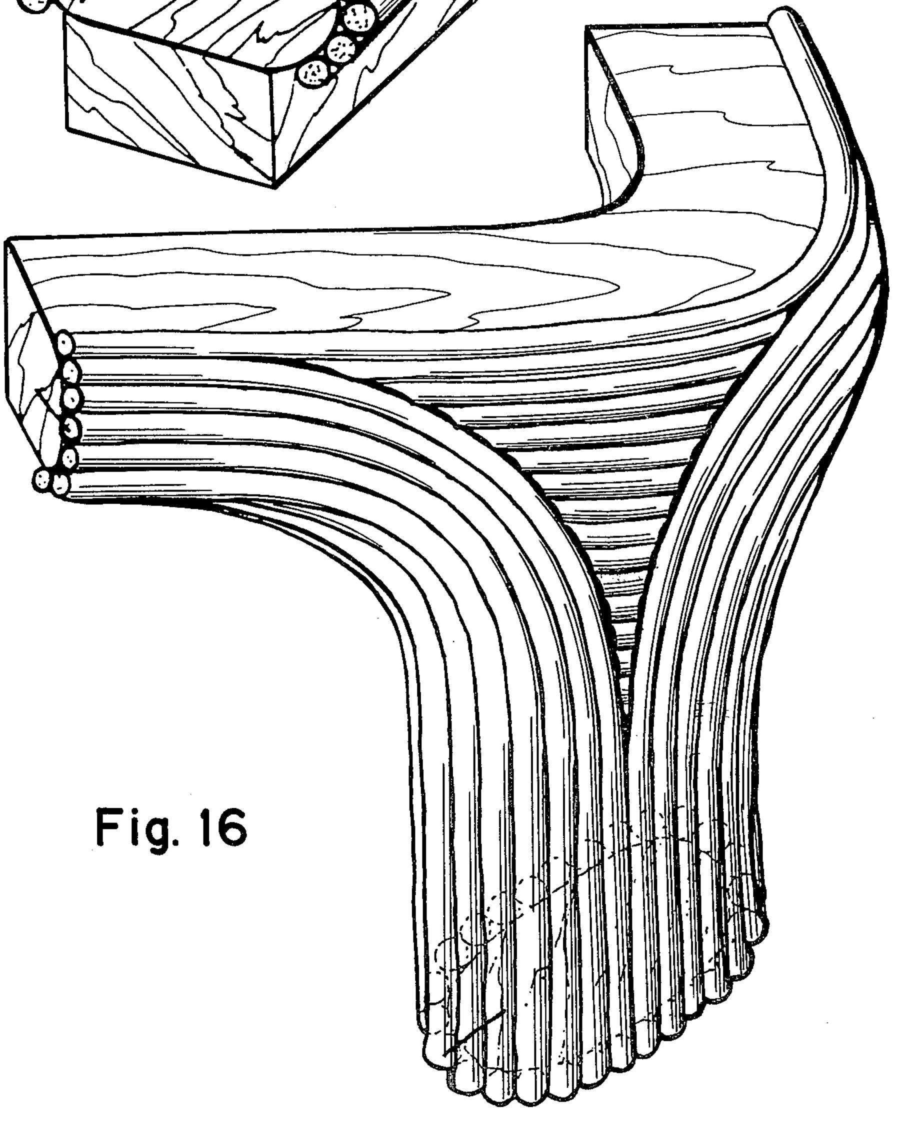
FIG. 16 shows detail $E_{11}$ of FIG. 14, left back side at seat level.
Figure 18:
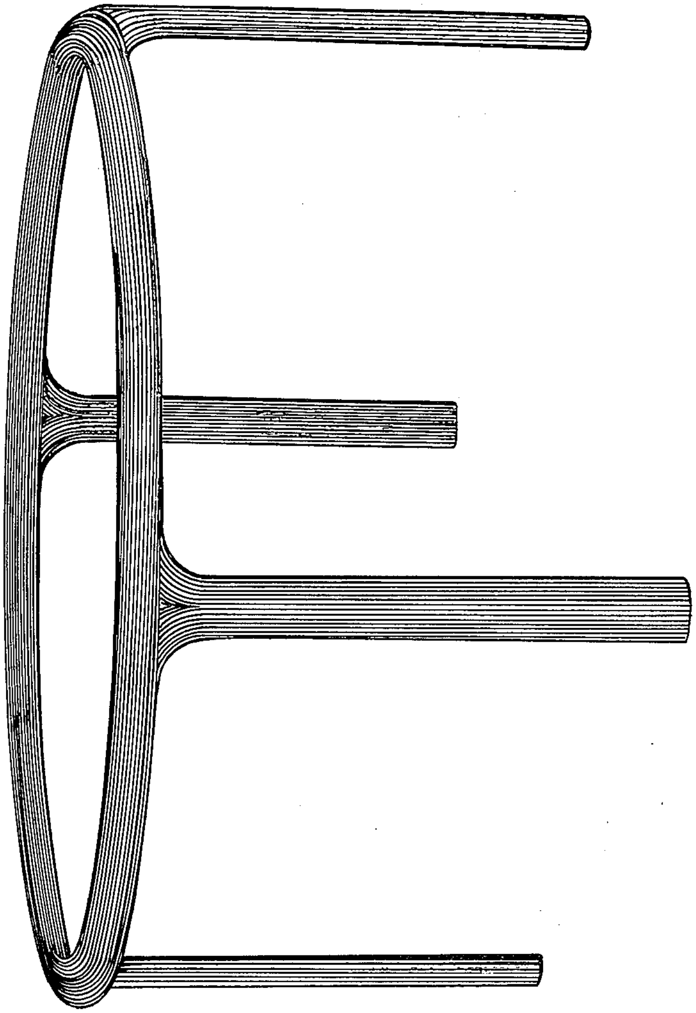
FIG. 18 shows a round table with the decoration element of the invention without a table plate.
Figure 19:
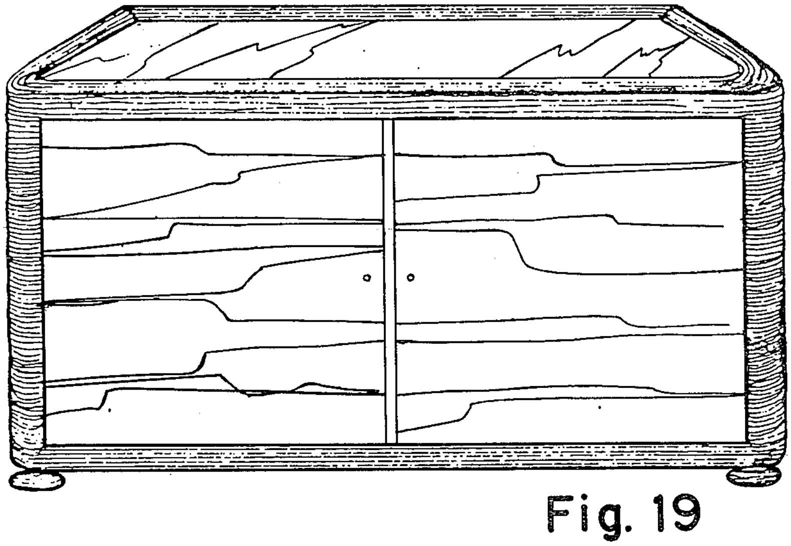
FIG. 19 shows a sideboard with the decoration element of the invention from the front.
Figure 21:
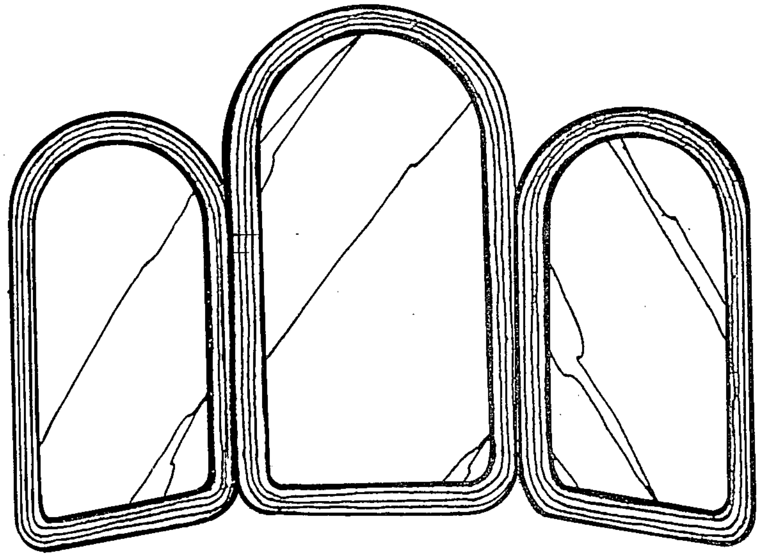
FIG. 21 shows a set of frames for mirrors with the decoration element of the invention in large and small versions.
Figure 20:
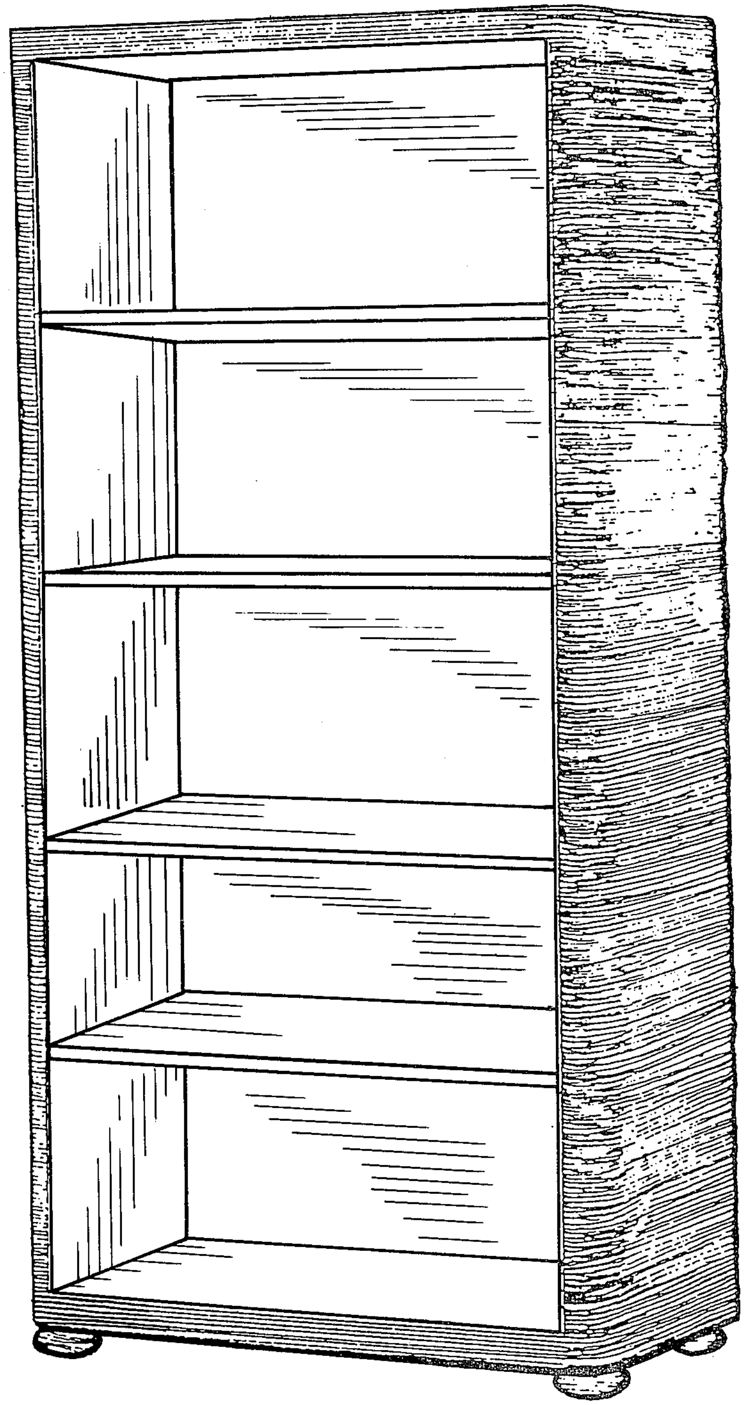
FIG. 20 shows a set of shelves, (rack) with the decoration element of the invention from the front.

Since the frame structure of seating furniture is mostly upholstered in the range of the seating frame, it is of course not necessary to cover that part of the frame with core strands which will not be visible because of the upholstery, as apparent for example in FIG. 17. This is also applicable to the area of the arm and backrests as shown in FIG. 14.

Figure 5:
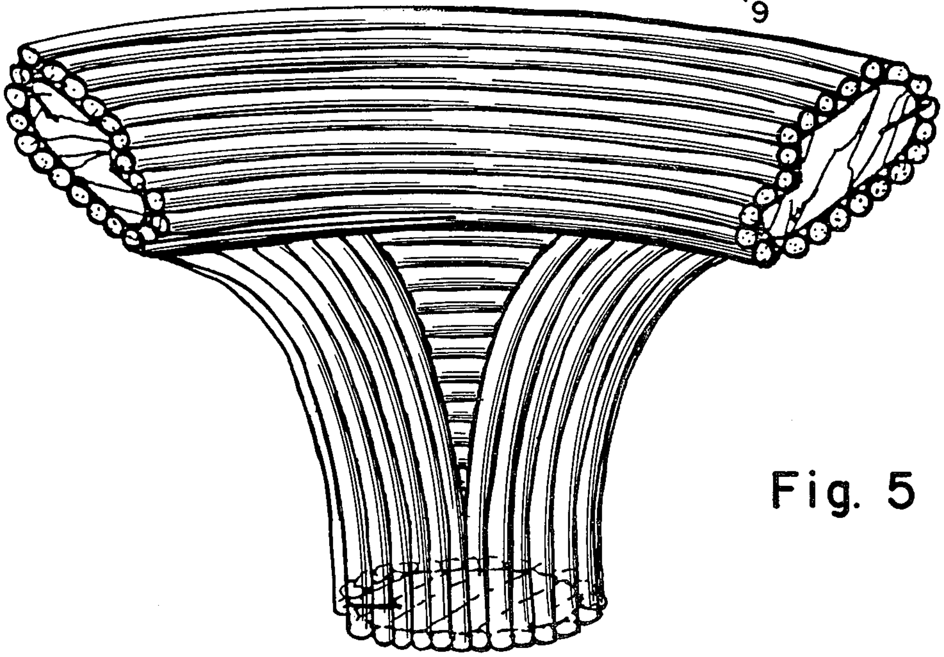
FIG. 5 shows detail $E_{02}$ of FIG. 2 (inside corner of the table)
Figure 3:
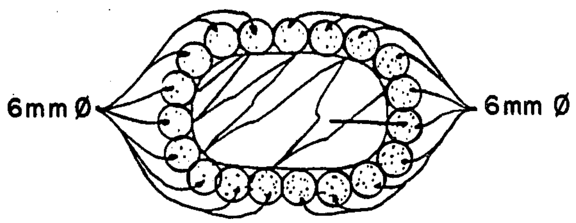
FIG. 3 shows the leg of the side or end table of FIG. 2 (detail $E_{03}$) in cross section.
Figure 4:
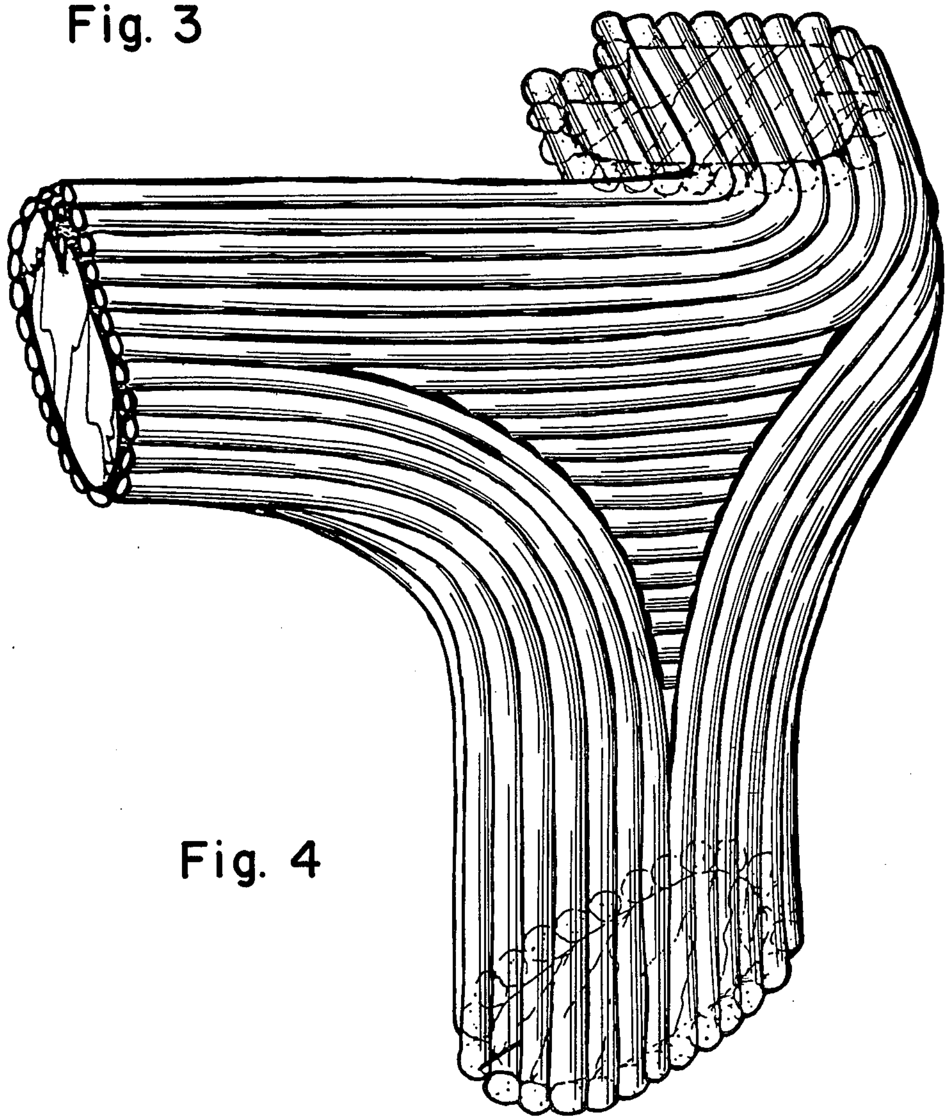
FIG. 4 shows detail $E_{01}$ of FIG. 2 (outside corner of the table)
Figure 8:
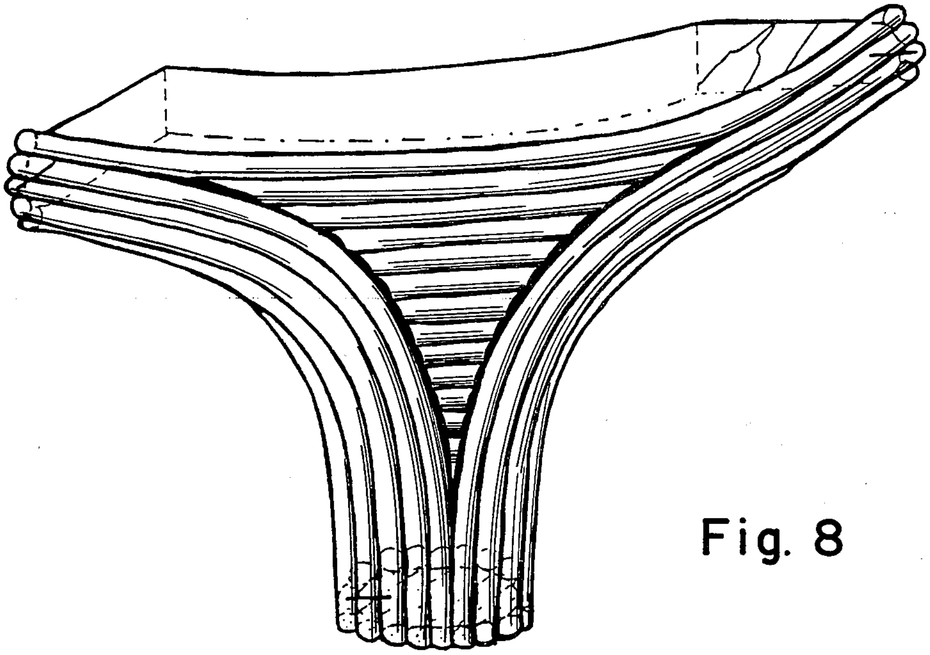
FIG. 8 illustrates the detail $E_{04}$ of FIG. 6, at seat level left back side.
Figure 9:
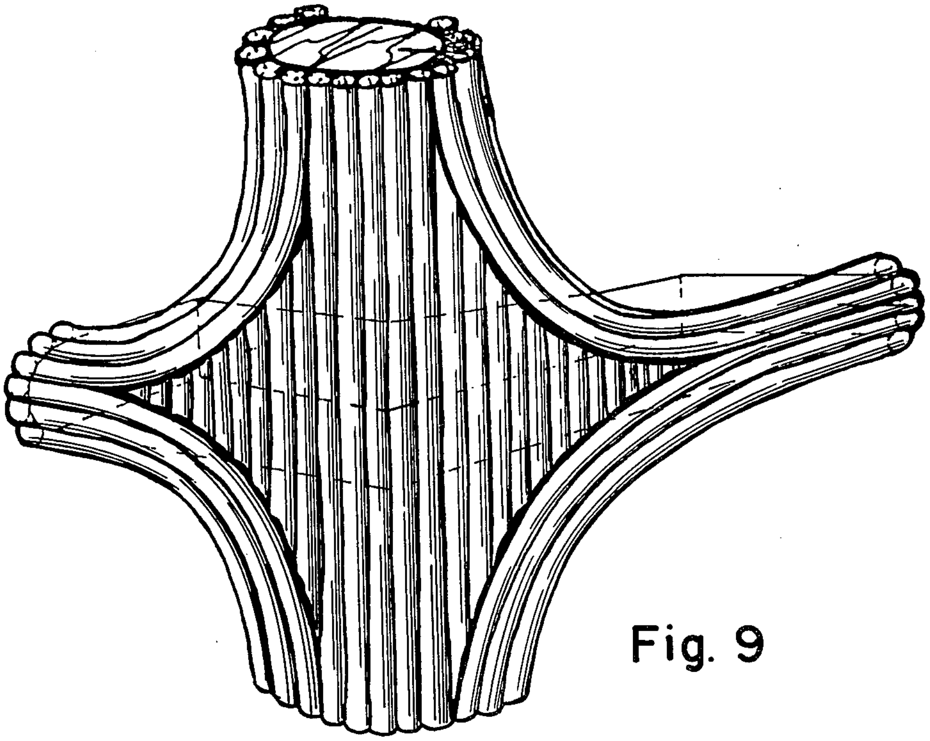
FIG. 9 illustrates the detail $E_{05}$ of FIG. 6, at seat level left front side.
Figure 12:
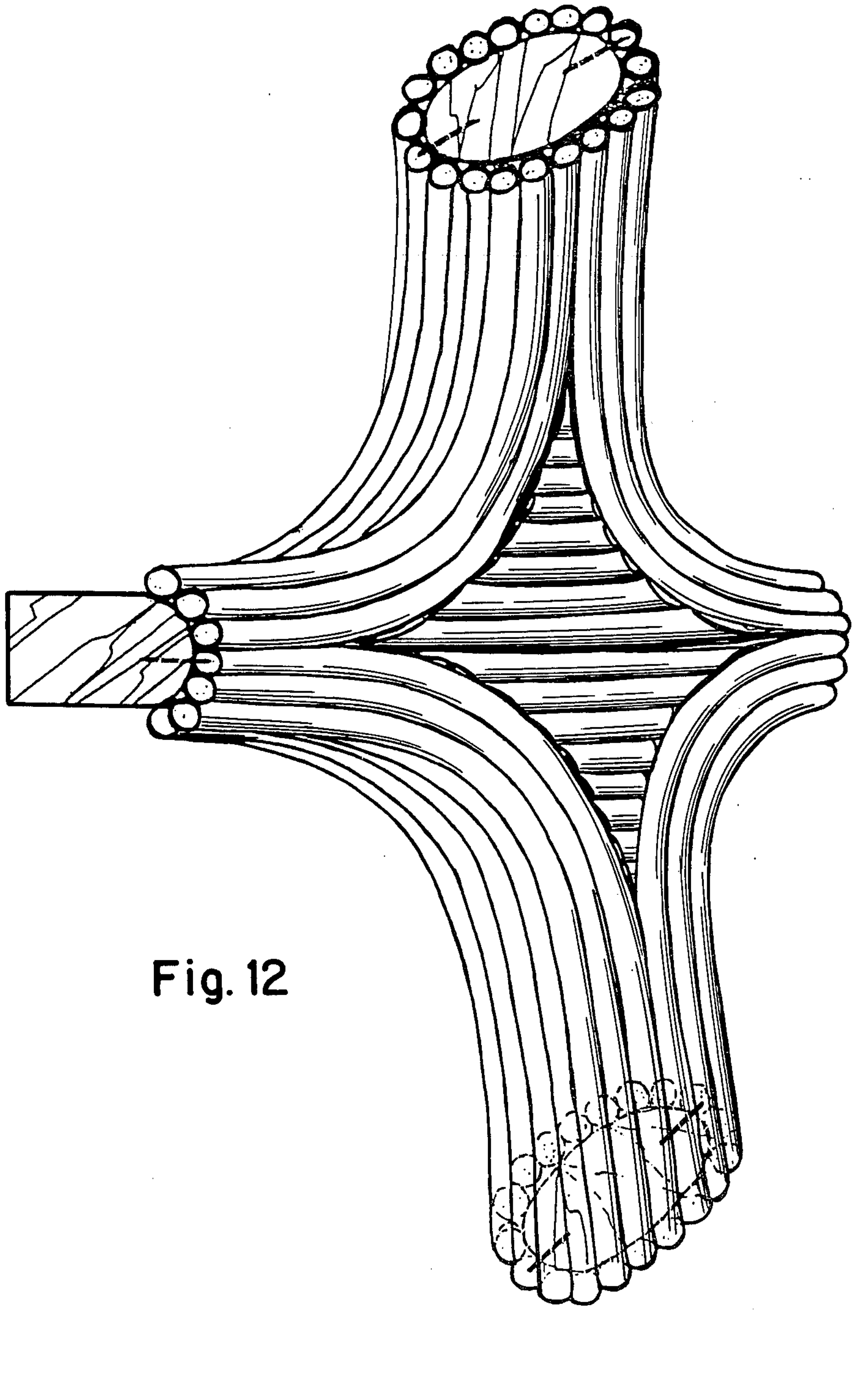
FIG. 12 illustrates detail $E_{07}$ of FIG. 10, left back side at seat level.
Figure 13:
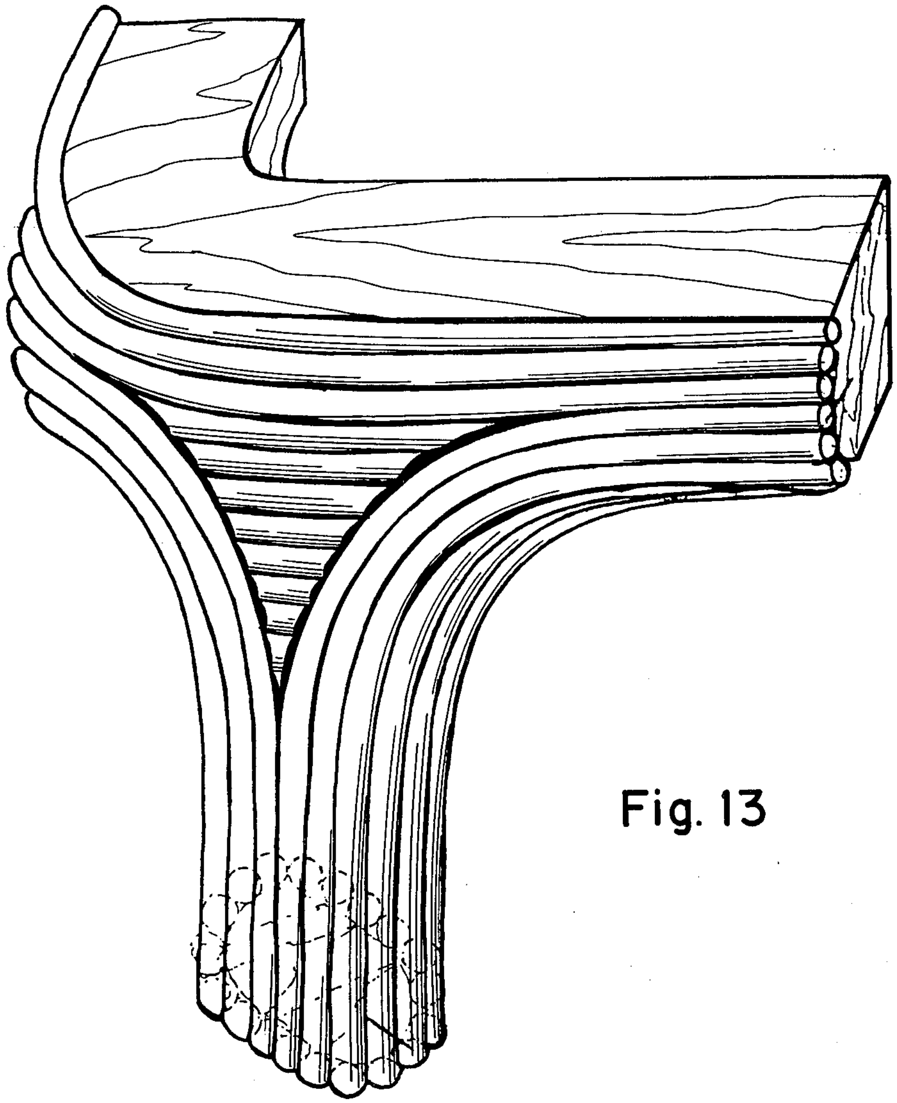
FIG. 13 illustrates detail $E_{08}$ of FIG. 10, left front side at seat level.

Since a clear glass plate might be used later as table plate for the frame of table T, the table framework must of course be covered entirely with core strands, as shown in FIG. 5. The table frame has a notch for accepting the rim of the table plate, so that the latter fits tightly into the table frame when the table is in use.

To be considered in addition is that the legs of seating furniture or tables should be rounded toward the bottom and optionally provided with gliders or rollers.

The following should also be noted in connection with the assembly: after setting the attachment pins along the desired line, the core strands, provided with glue on their bottom side, are centred on the pins and carefully pounded onto the pins until the strand is flush with the furniture frame. After work is completed, strips of material are tightly wound around the core strands and left there for one day while the glue sets or dries.

Before the finishing work on the decoration element commences, the glue residues must be removed after the strips of material have been removed. The surface of the core strands is then subjected to pre-cleaning, it is washed off, stained in the colour desired, provided with a colourless lacquer coating and finally sanded with fine steel wool.

Due to its particular structure, the palmyra core very readily absorbs moisture in its unfinished state, so that the stain can penetrate very deeply. The core material accepts the colour to a varying degree due to the somewhat different permeability values. The core will exhibit a play of colours from natural through brown.

Also to be taken into account is that the core strands attached to the legs of tables or seating furniture must not extend all the way down flush with the floor surface so as not to become part of the weight-carrying structure. In that case, the core strand might become detached from the furniture frame or even break off.

In a preferred embodiment of the frame structure of the model the table leg has a round-shaped profile which is preferably an oval cross-section. The supporting frame structure is also rounded off toward the outside around the table plate frame, and is provided on the inside rim of the table plate frame with a notch for later insertion of a table plate. To permit the use of a completely transparent table plate, the surface of and around the notch mentioned is also completely covered with the decorative element of the invention.

The preferred embodiment uses a covering applied to the table frame which is of palmyra core strands of preferably round cross-section, preferably 6 mm in diameter, attached to the frame with the aid of glue and pins not visible from the outside. Since as described above the core strands extend from the subface of one table leg to the subface of the neighbouring table leg, table legs each require an even number of core strands, which also applies to the legs of seating furniture as illustrated in FIGS. 6, 10, and 14. The number of required strands depends upon the diameter of the leg needed to carry the projected load, whether it belongs to a smaller or larger table, to an easy chair or armchair or to a 2- or 3-seater sofa.

As will be readily apparent, the outer circumference of the frame structure of a leg must have a dimension evenly divisible by the number of core strands of 6 mm diameter that are to be arranged and attached thereto. Sizing the frame structure of furniture legs that are to be covered with the decorative element of the invention thus requires great care in order to achieve the desired uniformity of the decorative element as demonstrated by the cross-section of the leg of the preferred embodiment.

I claim:

1. An article comprising:

frame means for providing a basic structure;

decoration means comprising a plurality of elongate strands made of the cores of either a tropical creeper or a tropical palm, each of said strands have substantially constant cross-sectional dimensions along the length thereof, said strands being secured to the exterior surfaces of said frame means with edges of adjacent strands touching; and securing means comprising pins of substantially constant cross-section extending from said frame and partially into said strands, and adhesive means between said strands and said frame means.

2. The article of claim 1, characterized by palmyra as the tropical palm.

3. The article of claims 1 or 2, characterized by strands that are approximately circular in cross-section.

4. The article of claim 3, characterized by the diameter of a strand being between 4–8 mm.

5. The article of claim 1, wherein said frame has at least one leg, and characterized by an even number of strands covering said leg.

6. The article of claim 5, wherein the outer circumference of said frame means is such that an even number of contiguous strands completely covers said exterior surface.

7. The article of claim 3 wherein the diameter of said strand is substantially 6mm.

* * * * *